(12) United States Patent
Cooley

(10) Patent No.: US 7,496,634 B1
(45) Date of Patent: Feb. 24, 2009

(54) DETERMINING WHETHER E-MAIL MESSAGES ORIGINATE FROM RECOGNIZED DOMAINS

(75) Inventor: Shaun Cooley, El Segundo, CA (US)

(73) Assignee: Symantec Corporation, Cupertino, CA (US)

( * ) Notice: Subject to any disclaimer, the term of this patent is extended or adjusted under 35 U.S.C. 154(b) by 800 days.

(21) Appl. No.: 11/031,114

(22) Filed: Jan. 7, 2005

(51) Int. Cl.
 *G06F 15/16* (2006.01)
(52) U.S. Cl. ............... 709/206; 709/205; 709/207; 709/225; 709/229
(58) Field of Classification Search ........... 709/205, 709/206, 207, 225, 229
 See application file for complete search history.

(56) References Cited

U.S. PATENT DOCUMENTS

| | | | |
|---|---|---|---|
| 6,691,156 B1* | 2/2004 | Drummond et al. | 709/206 |
| 6,842,773 B1* | 1/2005 | Ralston et al. | 709/206 |
| 6,931,433 B1* | 8/2005 | Ralston et al. | 709/206 |
| 6,965,919 B1* | 11/2005 | Woods et al. | 709/206 |
| 7,149,778 B1* | 12/2006 | Patel et al. | 709/206 |
| 7,249,175 B1* | 7/2007 | Donaldson | 709/225 |
| 7,321,922 B2* | 1/2008 | Zheng et al. | 709/206 |
| 7,359,948 B2* | 4/2008 | Ralston et al. | 709/206 |
| 2001/0049745 A1* | 12/2001 | Schoeffler | 709/238 |
| 2004/0181585 A1* | 9/2004 | Atkinson et al. | 709/206 |
| 2004/0243844 A1* | 12/2004 | Adkins | 713/201 |
| 2005/0108337 A1* | 5/2005 | Lorenz | 709/206 |
| 2006/0015563 A1* | 1/2006 | Judge et al. | 709/206 |
| 2006/0031319 A1* | 2/2006 | Nelson et al. | 709/206 |
| 2006/0053202 A1* | 3/2006 | Foo et al. | 709/206 |
| 2006/0129644 A1* | 6/2006 | Owen et al. | 709/206 |
| 2006/0168006 A1* | 7/2006 | Shannon et al. | 709/206 |
| 2006/0168057 A1* | 7/2006 | Warren et al. | 709/206 |

OTHER PUBLICATIONS

Dyck, Timothy, Review: Teros-100 APS 2.1.1, [Online] May 28, 2003, [Retrieved from the Internet on Oct. 6, 2004] Retrieved from the Internet: <URL:http://www.eweek.com/article2/0,1759,1110435,00.asp>, Woburn, MA, U.S.A.

* cited by examiner

*Primary Examiner*—Michael Won
(74) *Attorney, Agent, or Firm*—Fenwick & West LLP

(57) ABSTRACT

A message manager monitors incoming e-mail messages. The message manager determines whether the from field of each incoming e-mail message indicates that the e-mail message originates from a recognized domain. Responsive to determining that the from field indicates that the e-mail originates from a recognized domain, the message manager compares at least one domain associated with at least one link found embedded in the text of the e-mail message to a list of authorized domains. Based on the results of the comparison, the message manager determines whether the e-mail message originates from a recognized domain.

21 Claims, 3 Drawing Sheets

DETERMINING WHETHER E-MAIL MESSAGES ORIGINATE FROM RECOGNIZED DOMAINS

TECHNICAL FIELD

The present invention relates generally to computer security, and more particularly to determining whether e-mail messages originate from recognized domains.

RELATED APPLICATION

This application is related to commonly assigned U.S. patent application Ser. No. 11/026,290 entitled "Detection of Suspicious Electronic Messages," filed Dec. 30, 2004.

BACKGROUND ART

Phishing is a fraudulent activity that attempts to elicit personal, confidential, and/or financial information from unwitting victims. Phishing generally entails sending large numbers of electronic messages that fraudulently claim to be from a legitimate organization instructing the recipient to click on a link that leads to an official-looking yet bogus website. Once there, the user is encouraged to input confidential information such as credit card, Social Security, and bank-account numbers. The electronic message and the bogus website typically appear authentic, and may convey a message such as "the bank has lost some records and needs to verify information." The site typically includes an electronic form into which the user is directed to enter the requested information. The form, while official looking and seemingly addressed to a legitimate organization, channels the information to a third party, who misappropriates the confidential information.

The frequency of phishing campaigns is increasing at a dramatic and alarming rate. To illustrate just how clever phishing attacks can be, consider the phishing of PayPal®. Instead of using the letter "1" in PayPal®, the perpetrator used a san serif numeral "1," which looks the same. Despite the deceptive technique being right in front of the analysts from the beginning, the scam took several days to identify and resolve. Phishing is as much an attack of con artists as it is of hackers.

Counter measures to protect users from phishing have achieved limited success. Proposals for limiting phishing include electronic message authentication techniques using antispam standards and scanning for "cousin" domains whereby trademark owners would be notified when a similar sounding Uniform Resource Locator (URL) or site contains spoofed content. Additionally, features such as Norton Privacy Control in Symantec's Norton Internet Security product help to stem the increasing number of phishing attacks by allowing users to identify confidential data that they wish to protect. Upon observing the previously identified confidential data being transmitted via HTTP (via the web), instant messenger, or SMTP (via electronic message), the user is prompted to provide verification that the disclosure of the confidential information is authorized. Unfortunately, when a phishing attack is successful, the user believes that they are transmitting their confidential information to a reputable website, thus circumventing the intervention and causing the user to authorize the release of sensitive information to what is actually an illicit destination. Current regulatory and industry standards do not preclude electronic message addresses that imply an association with a legitimate site. For example, there is nothing to prevent a fraudulent party from acquiring the electronic message address of Citibankhelp.com, unless that electronic message address has already been reserved by Citibank or some other party.

There remains a clear need for an effective and automated way to protect confidential information from deceptive and fraudulent phishing campaigns. What is needed are methods, systems, and computer readable media to detect illicit phishing electronic messages associated with fraudulent attempts to steal confidential information and to reliably identify e-mail messages that originate from a recognized source and whose links are authenticated as being legitimate.

DISCLOSURE OF INVENTION

Methods, systems, and computer-readable media determine whether e-mail messages originate from recognized domains. A message manager monitors incoming e-mail messages. The message manager determines whether the from field of each incoming e-mail message indicates that the e-mail message originates from a recognized domain. Responsive to determining that the from field indicates that the e-mail originates from a recognized domain, the message manager compares at least one domain associated with at least one link found embedded in the text of the e-mail message to a list of authorized domains. Based on the results of the comparison, the message manager determines whether the e-mail message originates from a recognized domain.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

These and other more detailed features of the present invention are more fully disclosed in the following specification, reference being to the accompany drawings, in which.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
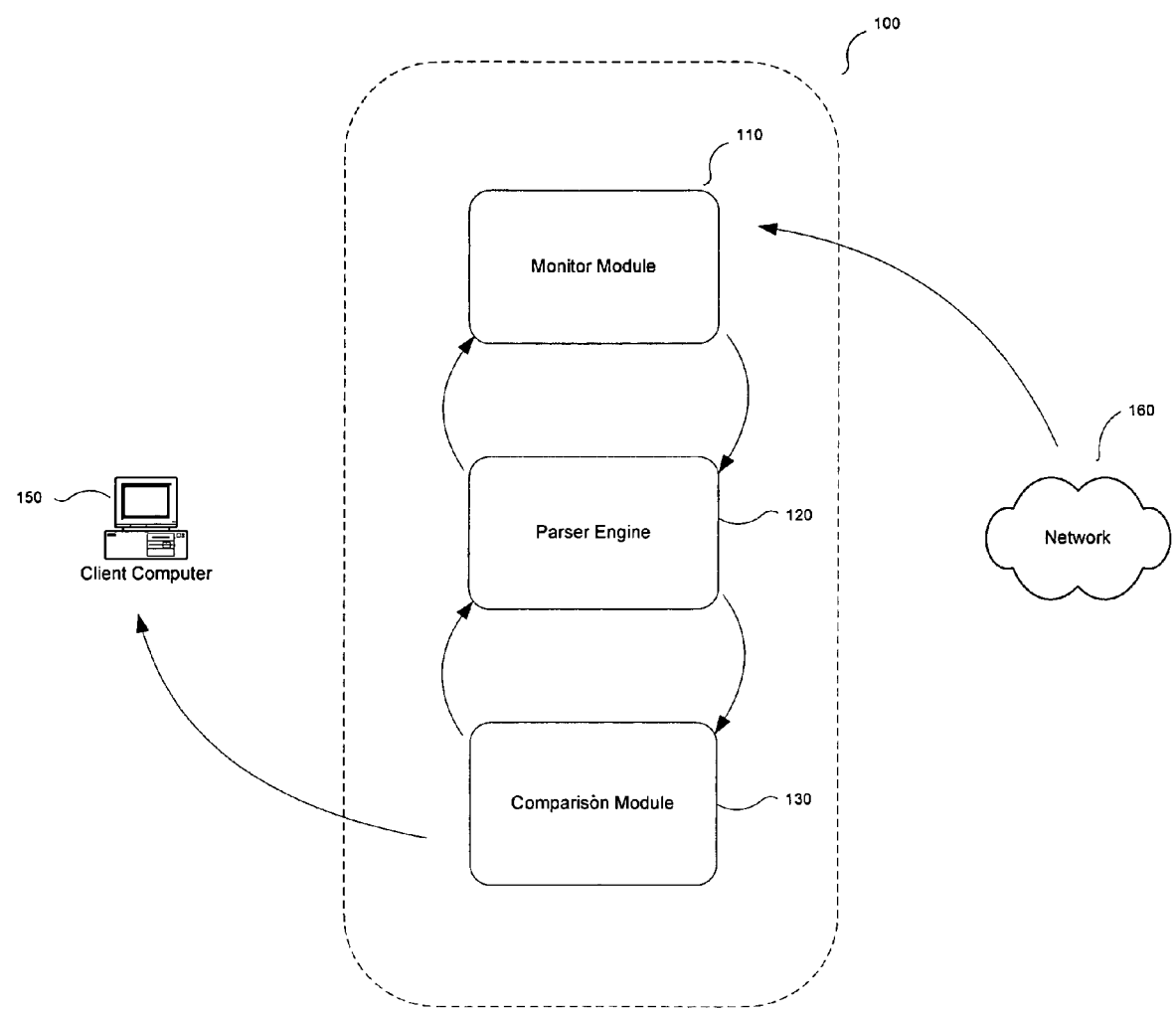
FIG. 1 is a high level block diagram of a system for detecting e-mail messages originating from a recognized domain according to some embodiments of the present invention.

FIG. 1 is a high level block diagram illustrating a system for identifying electronic messages originating from known domains according to some embodiments of the present invention. A message manager 100 monitors incoming electronic messages such as e-mail, instant messages, and the like to determine whether each message originates from a recognized domain. Messages that appear to be from a recognized domain are examined tQ confirm the legitimacy of the links contained within the body of the message. Responsive to the results of these comparisons, the message manager 100 determines whether the message actually originates from a recognized domain.

It is to be understood that although the message manager 100 is illustrated as a single entity, as the term is used herein a message manager 100 refers to a collection of functionalities that can be implemented as software, hardware, firmware or any combination of these. Where the message manager 100 is implemented as software, it can be implemented as a standalone program, but can also be implemented in other ways, for example as part of a larger program, as a plurality of separate programs, as one or more device drivers or as one or more statically or dynamically linked libraries. Likewise, the components of the message manager 100 refer to functionalities. A message manager 100 can be instantiated on and/or as part of a server, client, firewall, intrusion detection system, proxy, gateway, switch and/or any combination of these and/or or other computing devices and/or platforms.

In the embodiment illustrated in FIG. 1, the monitor module 110 of the message manager 100 examines incoming electronic messages addressed to a client computer 150. In some embodiments, the message manager 100 scans an e-mail stream traveling over a network 160 to a client computer 150. In other embodiments, the message manager 100 resides at least partially on the client 150, and filters the incoming electronic messages thereon. These and other implementation methodologies for examining incoming electronic messages can be successfully utilized by the message manager 100. These implementation methodologies are known within the art and the specifics of their application within the context of the present invention will be apparent to one of ordinary skill in the relevant art in light of this specification.

The from field of each e-mail message is analyzed to determine the sender's domain. The comparison module 130 and parser engine 120 of the message manager 100 work cooperatively with the monitor module 110 to compare the e-mail message's sender domain with a list of recognized domains (e.g., a list of domains of well known financial institutions). In response to matching the sender's domain with a domain on the list of recognized domains, the comparison module 130 compares domains of links embedded in the text of the message to a list of authorized domains associated with the recognized domain from which the message originates. The results of this comparison enable the message manager 100 to determine whether the message actually originates from a recognized domain or whether it is directing recipients to link to an unauthorized domain.

Figure 2:
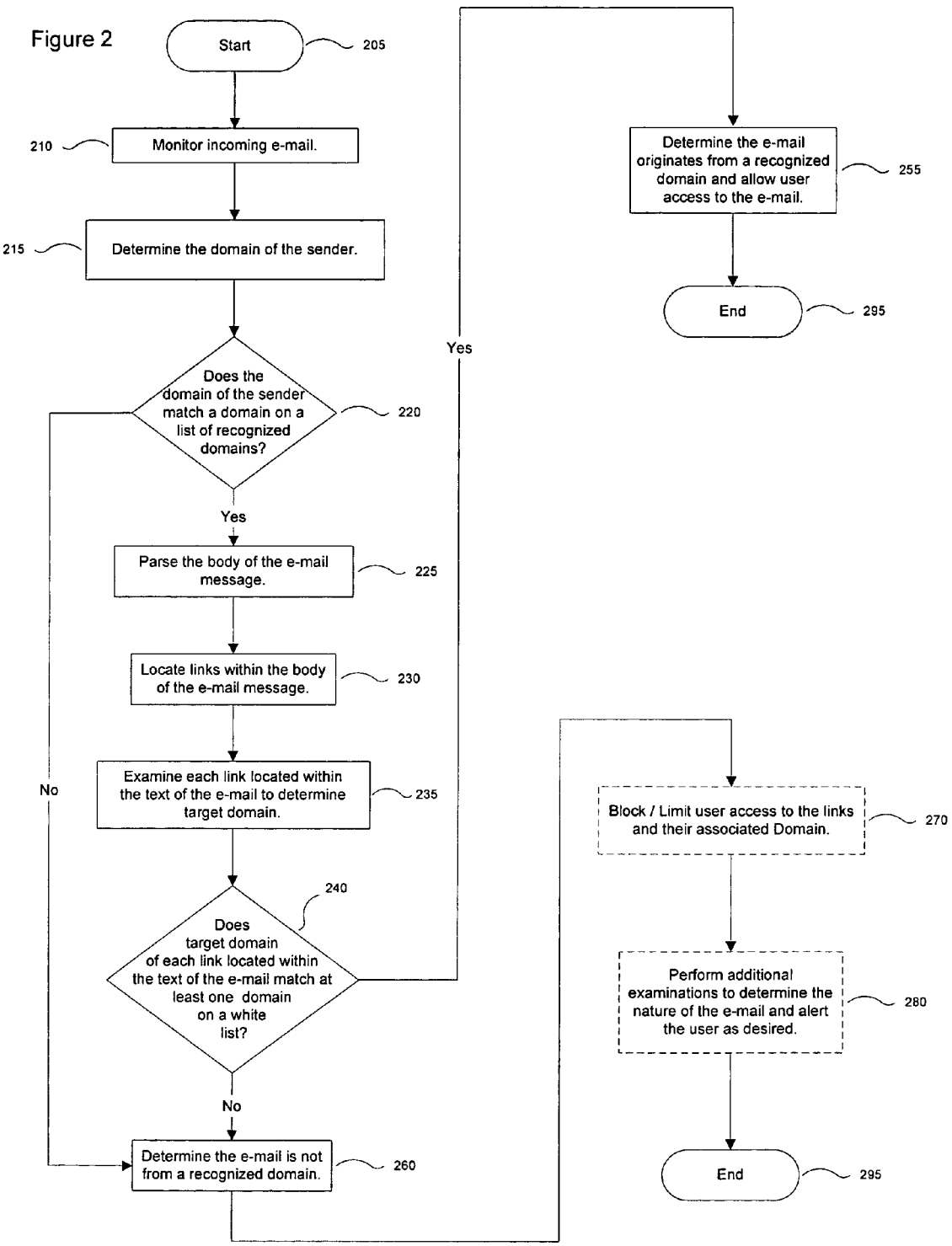
FIG. 2 is a flow diagram of one embodiment of the present invention for detecting e-mail messages originating from a recognized domain.

FIG. 2 is a high level flow diagram showing the steps of how the message manager 100 determines that a message is a valid communication from a recognized domain, according to one embodiment of the present invention. As described herein, the monitoring module 110 monitors 210 incoming electronic messages and parses header and text fields to enable the extraction 215 of sender information from the from field. The implementation methodologies for parsing header and text fields are known to those of ordinary skill in the relevant art, and their use in the context of the present invention will be apparent to those so skilled in light of the present specification. Upon determining the domain of the sender, the message manager 100 compares 220 the sender's domain to a list of recognized domains. Recognized domains can comprise domains that have been submitted by a vendor or third party and have been authenticated for their legitimacy. Recognized domains can also comprise domains the authenticity of which has been independently verified. In some embodiments, the list of recognized domains comprises domains of sites known to be potential phishing targets, and/or domains being specifically protected by the message manager 100. For example the list of recognized domains can comprise domains from financial institutions such as Citibank, Wells Fargo, Washington Mutual, American Express, Bank One, VISA, or from well known commerce sites such as E-Bay, Amazon, AOL, Yahoo, Microsoft, and the like.

In one embodiment, when the originating domain of the e-mail message matches a recognized domain, the message is filtered so as to pass the text of the message to a parser engine 120. The parser engine 120 further parses 225 the text of the body in search of 230 links embedded within the text of the message. Standard HTML parsing functionality can be used to identify all links contained in the electronic message, including, for example, web bugs (CSS, IMG, Script, etc.), Anchor tags, Link tags, FORM targets, and any other method of sending the user (or the user's data) to a remote site. Each embedded link is examined 235 to determine its target domain. Subsequently, the message manager 100 accesses a white list of authorized domains and the comparison module 130 compares the domain pointed to by each link found in the text of the message to the white list of authorized domains. In that embodiment, when each domain associated with each link found in the text of the message matches 240 a domain found in the white list, the message manager determines 255 that the message is not a phishing message, and typically allows the user to access the message. When at least one domain associated with a link in the text of the message does not match at least one domain contained in the white list, the message is considered suspect and the message manager 100 determines 260 that the message is not from a recognized domain. When the message manager 100 cannot determine that the electronic message is from a recognized domain, the message manager 100 can, in various embodiments of the present invention, block access 270 to the message, delete the message, limit access to the message, convey an alert to the user that the message does not originate from a recognized domain, or strip the embedded links from the message that did not match domains listed in the white list. In these embodiments, only if all links are found to be legitimate is the electronic message adjudicated to be authentic.

In one embodiment of the present invention, the message manager 100 maintains a domain specific white list of authorized domains for some or all recognized domains. The authorized domains can comprise, for example, domains to which e-mails from a recognized domain are expected to provide links. Upon matching 220 the sender's domain with a recognized domain, the message manager 100 can access a specific white list of authorized links corresponding to the previously matched recognized domain. A subsequent matching 240 by the comparison module 130 of each domain associated with a link in the message to domains authorized for the recognized domain provides evidence that the message is indeed a product of that recognized domain.

For example, consider a message directed to a user's e-mail client from the domain Citibank.com. After the monitoring module 110 detects the incoming e-mail, the parser engine 120 extracts sender information from the from field and determines that the e-mail originates from Citibank.com. In this example, this message's from domain, Citibank.com, matches 220 the Citibank.com domain on the recognized domain list. In response, the parser engine 120 parses 225 the text of the message and locates 230 several links embedded in the text. The domain associated 235 with each link found in the message is compared 240 to a white list of authorized Citibank domains. As discussed herein, the white list of authorized domains can be populated by either independently verifying the domains found on legitimate Citibank messages, or by Citibank providing a list of authorized domains to which Citibank messages can include links. In this example, when the domain of every link found in the text message matches a domain present on the Citibank white list, the message manager 100 would conclude 255 that the message is a valid communication from Citibank.

In some embodiments, messages that are identified as not originating from a recognized domain can be subject to further examination 280 for evidence of phishing, for example through techniques disclosed in the commonly assigned United States patent application entitled, "Detection of Suspicious Electronic Messages," filed 30 Dec., 2004.

Figure 3:
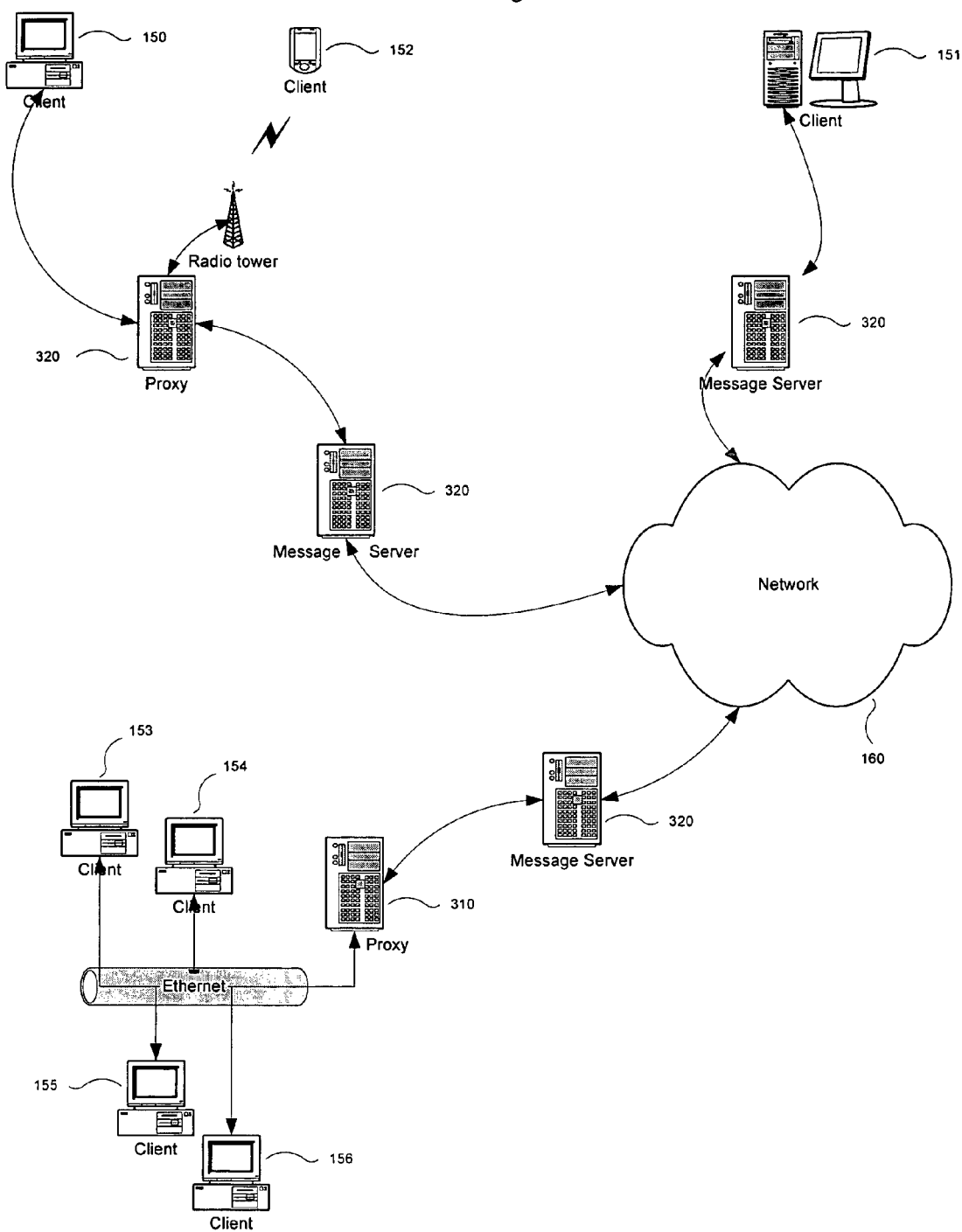
FIG. 3 is a block diagram of a network configuration for the detection of e-mail messages originating from a recognized domain according to one embodiment of the present invention.

FIG. 3 is a high level block diagram of the implementation architecture of one network environment embodiment of the present invention. As described herein, a message manager 100 can reside on a client computer 150, 151 . . . n, such as a desktop, laptop, PDA, etc. A message manager 100 can also reside on a proxy 310 device interposed between one or more client computers 150, 151 . . . n, and the network 160, electronic message server 320, or the like without altering its functionality. In another embodiment, the message manager 100 can reside on an SMTP or similar message server. Although exemplary embodiments described involve a "client" and a "server," the terms "client" and "server" are chosen for convenience and might not necessarily correspond directly to any particular role in a system design. The functionality of the message manager 100 can also be accomplished in a distributive setting between multiple computing devices, or be placed at a gateway or ISP to examine message streams.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, systems, engines, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for determining whether e-mail messages originate from recognized domains, the method comprising the steps of:
   examining incoming e-mail messages;
   for each incoming e-mail message, determining whether a from field of the e-mail message indicates that the e-mail message originates from a recognized domain;
   responsive to determining that the from field of an incoming e-mail message indicates that the e-mail message originates from a recognized domain, identifying a list of authorized domains associated with the recognized domain from which the from field indicates that the e-mail message originates;
   comparing at least one domain associated with at least one link embedded in the e-mail message to the list of authorized domains associated with the recognized domain; and
   determining whether the e-mail message originates from the recognized domain responsive to results of the comparing step.

2. The method of claim 1 wherein the determining whether the e-mail message originates from the recognized domain further comprises:
   responsive to at least one domain associated with at least one link embedded in the e-mail message not matching any domain in the list of authorized domains associated with the recognized domain, determining that the e-mail message does not originate from the recognized domain.

3. The method of claim 1 wherein the determining whether the e-mail message originates from the recognized domain further comprises:
   responsive to each domain associated with each link embedded in the e-mail message matching a domain in the list of authorized domains associated with the recognized domain, determining that the e-mail message comprises an e-mail message originating from the recognized domain.

4. The method of claim 2 further comprising:
   responsive to determining that the e-mail message does not originate from a recognized domain, performing a step from a group of steps consisting of:
   blocking user access to the e-mail message;
   limiting user access to the e-mail message;
   deleting the e-mail message;
   stripping at least one embedded link from the e-mail message; and
   outputting an alert concerning the e-mail message.

5. The method of claim 3 further comprising:
   responsive to determining that the e-mail message originates from the recognized domain, allowing user access to the e-mail message.

6. The method of claim 1 wherein the step of examining incoming e-mail further comprises:
   scanning an e-mail stream targeted to an e-mail client.

7. The method of claim 1 wherein the step of examining incoming e-mail further comprises:
   filtering incoming e-mail messages on an e-mail client.

8. At least one computer-readable storage medium containing an executable computer program product for determining whether e-mail messages originate from a recognized domain, the computer program product comprising:
   program code for examining incoming e-mail messages;
   program code for determining, for each incoming e-mail message, whether a from field of the e-mail message indicates that the e-mail message originates from a recognized domain;

program code for identifying a list of authorized domains associated with the recognized domain from which the from field indicates that the e-mail message originates responsive to a determination that the from field of the e-mail message indicates that the e-mail message originates from a recognized domain;

comparing at least one domain associated with at least one link embedded in the e-mail message to the list of authorized domains associated with the recognized domain; and program code for determining whether the e-mail message originates from the recognized domain responsive to results of the comparing step.

9. The computer program product of claim 8 wherein the program code for determining whether the e-mail message originates from the recognized domain further comprises:

program code for determining that the e-mail message does not originate from the recognized domain responsive to at least one domain associated with at least one link embedded in the e-mail message not matching any domain in the list of authorized domains associated with the recognized domain.

10. The computer program product of claim 8 wherein the program code for determining whether the e-mail message originates from the recognized domain further comprises:

program code for determining that the e-mail message comprises an e-mail message originating from the recognized domain responsive to each domain associated with each link embedded in the e-mail message matching a domain in the list of authorized domains associated with the recognized domain.

11. The computer program product of claim 9 further comprising:

program code for performing, responsive to determining that the e-mail message does not originate from the recognized domain, a step from a group of steps consisting of:

blocking user access to the e-mail message;
limiting user access to the e-mail message;
deleting the e-mail message;
stripping at least one embedded link from the e-mail message; and
outputting an alert concerning the e-mail message.

12. The computer program product of claim 10 further comprising:

program code for allowing user access to the e-mail message responsive to determining that the e-mail message comprises an e-mail message originating from the recognized domain.

13. The computer program product of claim 8 wherein the program code for examining incoming e-mail further comprises:

program code for scanning an e-mail stream targeted to an e-mail client.

14. The computer program product of claim 8 wherein the program code for examining incoming e-mail further comprises:

program code for filtering incoming e-mail messages on an e-mail client.

15. A computer system for determining whether e-mail messages originate from a recognized domain, the computer system comprising:

a computer-readable storage medium containing an executable computer program product comprising:

a software portion configured to examine incoming e-mail messages;

a software portion configured to determine, for each incoming e-mail message, whether a from field of that e-mail message indicates that the e-mail message originates from a recognized domain;

a software portion configured, responsive to determining that the from field of an incoming e-mail message indicates that the e-mail message originates from a recognized domain, to identify a list of authorized domains associated with the recognized domain from which the from field indicates that the e-mail message originates;

a software portion configured to compare at least one domain associated with at least one link embedded in the e-mail message to the list of authorized domains associated with the recognized domain; and a software portion configured to determine whether the e-mail message comprises a phishing e-mail message responsive to results of the comparing step.

16. The computer system of claim 15 wherein the software portion configured to determine whether the e-mail message comprises a phishing e-mail message is further configured to:

determine that the e-mail message is a phishing e-mail message responsive to at least one domain associated with at least one link embedded in the e-mail message not matching any domain in the list of authorized domains associated with the recognized domain.

17. The computer system of claim 15 wherein the software portion configured to determine whether the e-mail message comprises a phishing e-mail message is further configured to:

determine that the e-mail message is not a phishing e-mail message responsive to each domain associated with each link embedded in the e-mail message matching a domain in the list of authorized domains associated with the recognized domain.

18. The computer system of claim 16 further comprising:

a software portion configured to perform, responsive to determining that the e-mail message is a phishing e-mail message, a step from a group of steps consisting of:

blocking user access to the e-mail message;
limiting user access to the e-mail message;
deleting the e-mail message;
stripping at least one embedded link from the e-mail message; and
outputting an alert concerning the e-mail message.

19. The computer system of claim 17 further comprising:

a software portion configured to allow user access to the e-mail message responsive to determining that the e-mail message is not a phishing e-mail message.

20. The computer system of claim 15 wherein the software portion configured to examine incoming e-mail is further configured to:

scan an e-mail stream targeted to an e-mail client.

21. The computer system of claim 15 wherein the software portion configured to examine incoming e-mail is further configured to:

filter incoming e-mail messages on an e-mail client.

* * * * *

UNITED STATES PATENT AND TRADEMARK OFFICE
CERTIFICATE OF CORRECTION

PATENT NO. : 7,496,634 B1
APPLICATION NO. : 11/031114
DATED : February 24, 2009
INVENTOR(S) : Shaun Cooley It is certified that error appears in the above-identified patent and that said Letters Patent is hereby corrected as shown below:

Column 6, line 22, Claim 2, after "wherein", delete "the".
Column 6, line 30, Claim 3, after "wherein", delete "the".

Signed and Sealed this

Fourteenth Day of April, 2009

JOHN DOLL
*Acting Director of the United States Patent and Trademark Office*